US010673124B2

United States Patent
Lee et al.

(10) Patent No.: US 10,673,124 B2
(45) Date of Patent: Jun. 2, 2020

(54) RADIO ANTENNA INTEGRATION IN A MOBILE COMPUTING DEVICE

(71) Applicant: INTEL CORPORATION, Santa Clara, CA (US)

(72) Inventors: Warren Lee, San Jose, CA (US); Kwan Ho Lee, Mountain View, CA (US); Ulun Karacaoglu, San Diego, CA (US); Manish A. Hiranandani, Santa Clara, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 15/640,413

(22) Filed: Jun. 30, 2017

(65) Prior Publication Data

US 2019/0006735 A1    Jan. 3, 2019

(51) Int. Cl.
*H01Q 1/22* (2006.01)
*H01Q 1/24* (2006.01)
(Continued)

(52) U.S. Cl.
CPC ......... *H01Q 1/2266* (2013.01); *G06F 1/1601* (2013.01); *G06F 1/1656* (2013.01);
(Continued)

(58) Field of Classification Search
CPC ... G06F 1/1601; G06F 1/1656; H01Q 1/2266; H01Q 1/245; H01Q 9/42; H01Q 21/28; H01Q 1/521; H01Q 5/371; H01Q 5/378
See application file for complete search history.

(56) References Cited

U.S. PATENT DOCUMENTS

2011/0286166 A1* 11/2011 Nam ............... G06F 1/1601
                                                        361/679.01
2012/0155005 A1*  6/2012 Lee ............... G06F 1/162
                                                        361/679.26
(Continued)

FOREIGN PATENT DOCUMENTS

JP          2004005516 A       1/2004

OTHER PUBLICATIONS

European Search Report for related European Patent Application No. 18175271.8 with a completion date of Nov. 14, 2018, and dated Nov. 23, 2018, 8 pages.

*Primary Examiner* — Graham P Smith
*Assistant Examiner* — Jae K Kim
(74) *Attorney, Agent, or Firm* — International IP Law Group, P.L.L.C.

(57) ABSTRACT

Techniques for integrating a plurality of radio antennas in an electronic device are described. An example of an electronic device includes a display housing with a display screen and top bezel disposed above the display screen, and a plurality of components disposed in the top bezel. The plurality of components include a first cellular communication antenna disposed on a first side of the top bezel, and a second cellular communication antenna disposed on a second side of the top bezel opposite the first side. The plurality of components also include a first WiFi antenna disposed adjacent to the second cellular communication antenna, and a second WiFi antenna disposed adjacent to the second cellular communication antenna on an opposite side from the first WiFi antenna.

25 Claims, 13 Drawing Sheets

(51) Int. Cl.
  *H01Q 21/28* (2006.01)
  *G06F 1/16* (2006.01)
  *H01Q 9/42* (2006.01)
  *H01Q 5/378* (2015.01)
  *H01Q 1/52* (2006.01)
  *H01Q 5/371* (2015.01)

(52) U.S. Cl.
  CPC ............... *H01Q 1/245* (2013.01); *H01Q 9/42* (2013.01); *H01Q 21/28* (2013.01); *H01Q 1/521* (2013.01); *H01Q 5/371* (2015.01); *H01Q 5/378* (2015.01)

(56) References Cited

U.S. PATENT DOCUMENTS

| | | | |
|---|---|---|---|
| 2012/0235635 A1* | 9/2012 | Sato | H01Q 1/243 320/108 |
| 2014/0239781 A1 | 8/2014 | Allore et al. | |
| 2014/0323068 A1* | 10/2014 | Chang | H04B 1/3838 455/127.2 |
| 2015/0280318 A1 | 10/2015 | Yang et al. | |
| 2016/0061983 A1 | 3/2016 | Heikura | |
| 2018/0284905 A1* | 10/2018 | Hewett | G06F 1/1662 |

* cited by examiner

200

US 10,673,124 B2

RADIO ANTENNA INTEGRATION IN A MOBILE COMPUTING DEVICE

TECHNICAL FIELD

This disclosure relates generally to mobile computing device such as laptop computers, tablet computers, and 2-in-1 laptop computers. More specifically, the disclosure describes techniques for integrating multiple radio antennas in a single bezel of the computing device.

BACKGROUND

The number of integrated wireless technologies included in mobile computing devices such as 2-in-1 notebooks is increasing. These wireless technologies include, but are not limited to, WIFI, WiGig, and Wireless Wide Area Network (WWAN) technologies such as Long-Term Evolution (LTE). Each wireless technology specifies certain certification standards that pertain to antenna isolation and others factors. Additionally, regulatory standards limit the Specific Absorption Rate (SAR) caused by wireless systems, which is a measure of the rate at which energy is absorbed by the human body when exposed to radio frequency signals. To meet these regulatory standards, SAR sensors may be used to detect the presence of human tissue, which reduces the available space for antennas. The carrier certification and regulatory standards tend to increase the space required for the antennas to provide suitable performance. At the same time, the available space within the device for the antennas that support these wireless technologies is shrinking. With the addition of a 3D user-facing camera, the available volume for antennas is further reduced.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for integrating multiple radio antennas in a single bezel of a computing device. Currently, to meet regulatory and carrier certification standards while maximizing performance, many platforms require the utilization of multiple bezels around the display to integrate the antennas. Even with multiple bezels, various implementation costs and challenges have reduced the availability of WLAN/LTE and WiGig for 2-in-1 notebook designs.

The antenna system described herein reduces the overall space consumed by the antennas and accompanying circuitry. This enables the entire antenna complex to fit within a single top bezel of the computing device. Accordingly, several wireless systems can be conveniently incorporated into the computing device, including WLAN/LTE and WiGig while still providing space for additional features such as a 3D camera. Additionally, incorporating the entire antenna complex in a single top-bezel allows for the side bezels to be significantly reduced in size or even eliminated, which enables the implementation of an edge-to-edge display. As used herein, the term edge-to-edge display refers to a display that extends across a full width of the display housing.

Figure 1:
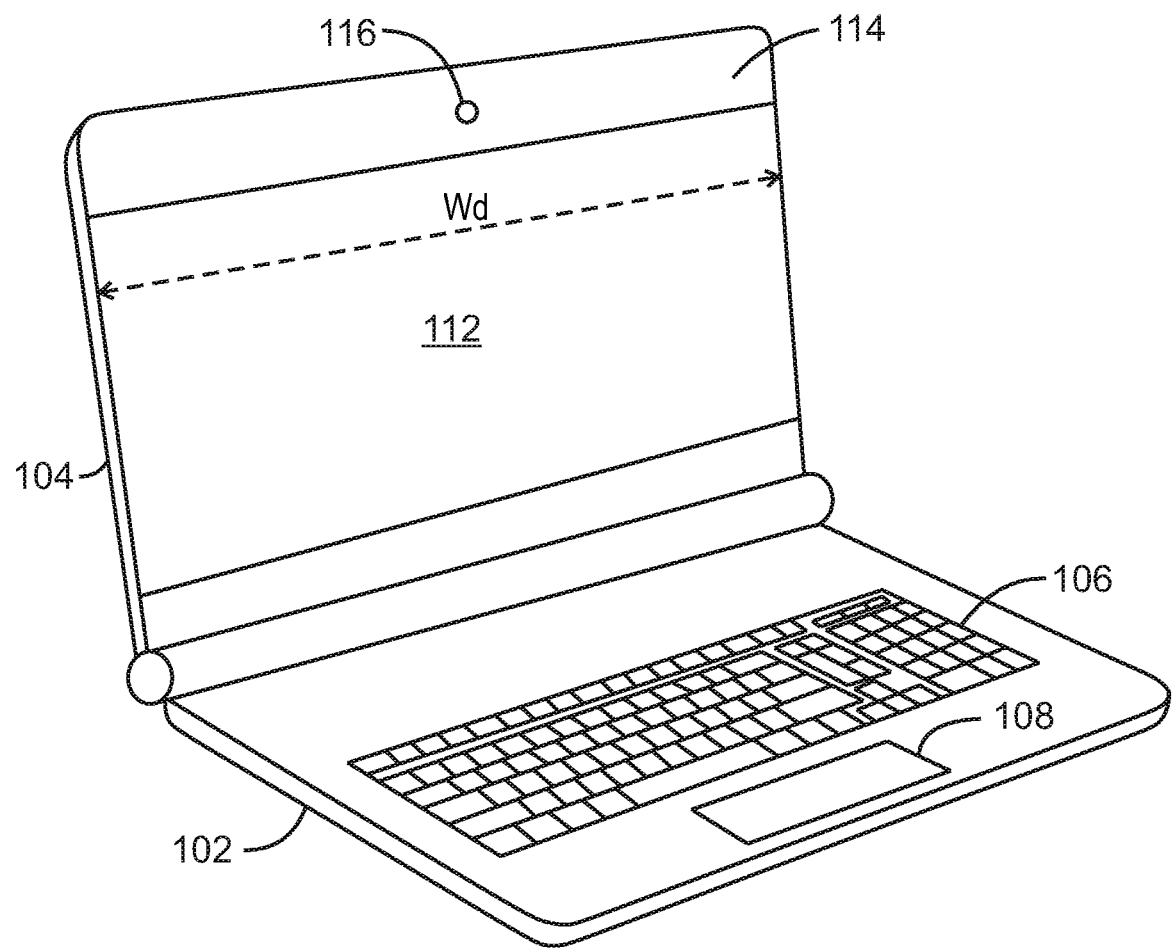
FIG. 1 is a perspective view of a computing device in accordance with embodiments.

FIG. 1 is a perspective view of a computing device in accordance with embodiments. The computing device 100 may be a laptop computer or a 2-1 notebook computer, for example. Furthermore, although the computing device 100 is depicted as a laptop style computer, the present techniques are also applicable to tablet computers and other types of computing devices.

The computing device 100 shown in FIG. 1 includes a base 102, as well as a display housing 104 that is pivotally attached to the base 102. The base 102 of the computing device 100 may include a keyboard 106, a touchpad 108, and other user input devices.

The display housing 104 of the computing device 100 includes a display screen 112, which may be a touch-screen display. In some embodiments, the display screen 112 extends the full width of the display housing as shown in FIG. 1. However, the display housing 104 may also include side bezels that prevent the display screen 112 from extending the full width of the display housing. The display housing 104 also houses several additional electronic components, such as processors, memory, mass storage devices, battery, and others. The display screen 112 may be any suitable size. In some embodiments, the display screen size, as measured by the length of the diagonal, may be a 13 inch, 12 inch, or 11 inch, or smaller.

The computing device 100 may be a 2-in-1 laptop, in which case the base 102 may be detached from the display housing 104 and/or rotated behind the back of the display housing 104. In such a configuration, the computing device 100 may be controlled by the user through the touch-screen.

The computing device 100 also includes a top bezel 114, which provide space for a number of antenna systems and other components to be incorporated above the display screen 112. The width, $W_d$, of the top bezel 114 may be approximately the same width as the display screen 112. For an 11 inch display screen, the width of the top bezel may be approximately 240 mm. For a 12 inch display screen, the width of the top bezel may be approximately 260 mm. For a 13 inch display screen, the width of the top bezel may be approximately 285 mm.

The computing device 110 may also include a camera 116 disposed in the top bezel 114. The camera may be any suitable style of camera, including a 3D camera such as a stereo camera with two or more lenses.

It is to be understood that the block diagram of FIG. 1 is not intended to indicate that the computing device 100 is to include all of the components shown in FIG. 1. Rather, the computing device 100 can include fewer or additional components not illustrated in FIG. 1. Details about the arrangement of the antenna systems disposed in the top bezel are described further below.

Figure 2:
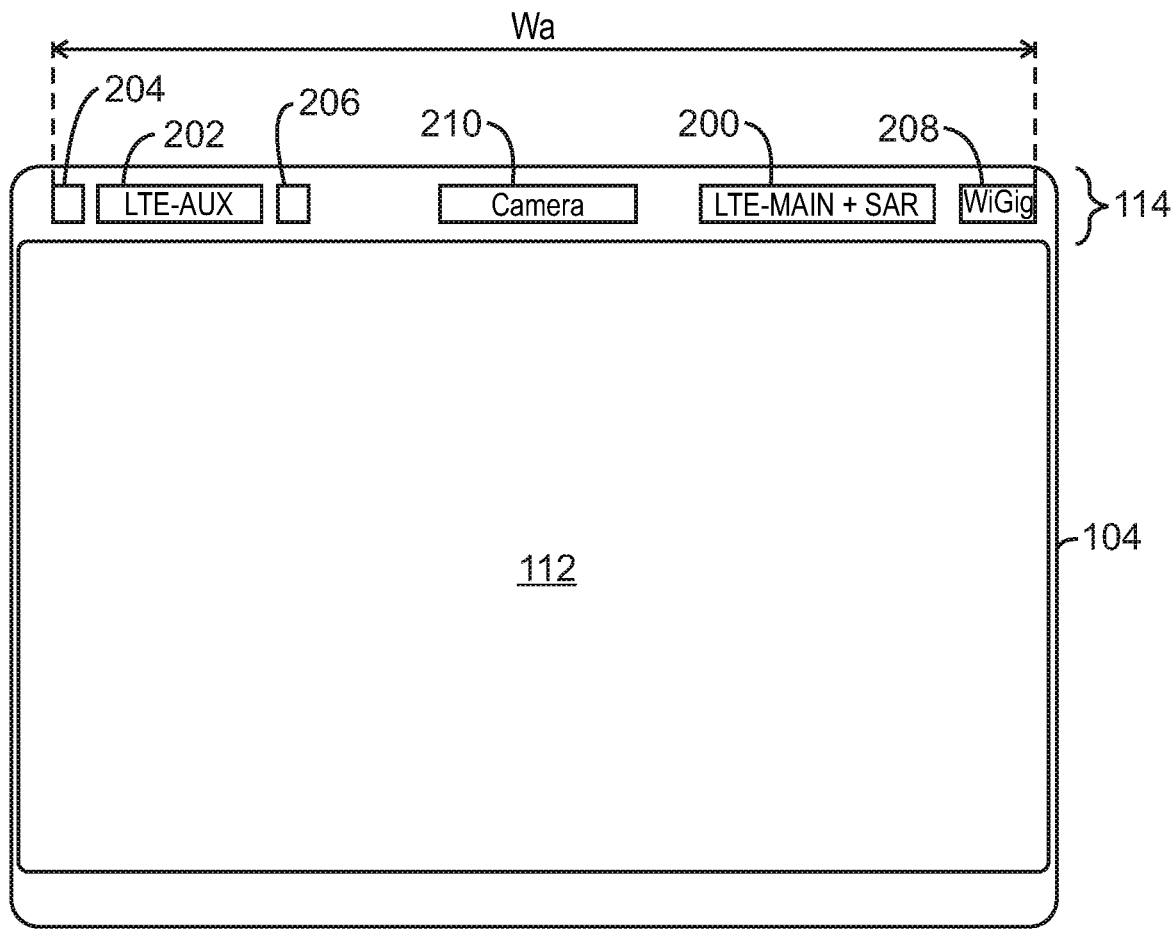
FIG. 2 is a diagram showing an example arrangement of antenna systems disposed within the top bezel of a computing device.

FIG. 2 is a diagram showing an example arrangement of antenna systems disposed within the top bezel of a computing device. For the sake of simplicity, the example computing device 100 of FIG. 2 shows only the display housing 104. However, it will be appreciated that the computing device 100 may also include the base as described above in relation to FIG. 1.

The top bezel 114 of the display housing 104 houses several components, and can house all of the antennas included in the computing device 100. The various components may be disposed side-by-side between the left side of the top bezel 114 and the right side of the top bezel 114 without overlap. Furthermore, it will be appreciated that the disclosed component layouts can also include the mirror image of the specific arrangements shown in the figures.

In the example shown in FIG. 2, the top bezel 114 of the display housing 104 houses two cellular communication antennas, including an LTE-Main antenna 200 and an LTE-Auxiliary antenna 202. The LTE main antenna 200 is used for transmitting and receiving LTE signals. The LTE main antenna 200 may also serve as a SAR proximity sensor or may include a built-in SAR proximity sensor. LTE-Auxiliary antenna 202 is used for receiving only, and does not require SAR sensing. In some embodiments, the LTE-main antenna 202 may be approximately 70 mm wide when it includes SAR sensor flexible PCB or 50 mm for antenna body only, and the LTE-Auxiliary antenna 202 may be approximately 50 mm wide. Additionally, although LTE antennas are shown, antenna 200 and antenna 202 may use other cellular communication standards, such as 4G, 5G, and others.

The top bezel 114 of the display housing 104 also houses two WLAN antennas, referred to herein as WiFi antennas 204 and 206, which are disposed on either side of the LTE-Auxiliary antenna 202. Both WiFi antennas a configured for transmitting and receiving in accordance with any suitable WiFi protocol. As explained further below in relation to FIG. 9, each WiFi antenna also serves as a SAR proximity sensor pad. Accordingly, separate WiFi SAR sensors are not needed, which further reduces the space needed for the WiFi antenna system. In some embodiments, the width of each WiFi antenna 204 and 206 may be approximately 10 mm.

The top bezel 114 of the display housing 104 also includes a WiGig Radio Front End Module (RFEM) 208. The WiGig RFEM 208 is configured to provide multi-gigabit per second wireless communications over the unlicensed 60 GHz frequency band in accordance with the IEEE 802.11ad protocol. The WiGig RFEM can include multiple millimeter wave antennas for phased array and Multiple Input Multiple Output (MIMO) operation. The WiGig RFEM 208 also includes additional circuitry such as RF filters, RF amplifiers, mixers, and the like. In some embodiments, the width of the WiGig RFEM 208 may be approximately 20 millimeters. The separation distance between the WiGig RFEM 208 and the LTE-Main antenna may be approximately 5 mm.

The top bezel 114 of the display housing 104 can also include a camera module 210. The camera module 210 may be a stereoscopic camera module and can include a pair of CMOS sensors wide angle lenses and other supporting circuitry for capturing images. In some embodiments, the width of the camera module 210 may be approximately 60 millimeters.

The smaller size of the various antennas enables the antenna complex to fit within the limited space available within the top bezel. Assuming a separation distance of 5 mm between each of the components included in the top bezel 114, the overall width, $W_a$, of the antenna complex may be approximately 245 mm, which allows it to fit within the top bezel of an 11 inch display screen. It will be appreciated that the specific dimensions described above are provided as examples, and that the width of the components and the separation between them may vary depending on the features of a particular design. For example, in some cases the separation distance may be reduced while still providing suitable electrical isolation.

The relative spatial arrangement of the antennas also provides several advantages. The WiGig RFEM 208 may include an antenna array for adaptive beamforming. Placing the WiGig RFEM 208 on the corner of the top bezel allows for rear direction radiation as well as unobstructed side radiation on one-side.

The LTE-Main antenna 200 and LTE-Auxiliary antenna 202 are separated on opposite sides of the top bezel 114 to improve isolation and spatial diversity. The requirements for the LTE antennas are more stringent than the WiFi antennas, because LTE is also subject to carrier certification in addition to regulatory approval. Accordingly, the separation of the LTE antennas is prioritized over the separation of the WiFi antennas. The edge-to-edge spacing between the LTE-Main antenna 200 and LTE-Auxiliary antenna 202 may be approximately 85 mm for an 11-inch display or greater for larger displays.

Additionally, the camera module 210 can potentially introduce RF interference to the antennas. Accordingly, the distance between the antennas and the camera module 210 may be increased to reduce the possibility of interference. Increasing the spacing between the LTE-Main antenna 200 and LTE-Auxiliary antenna 202 as much as possible within the constraints of the display's width serves to improve spatial diversity of the LTE antennas and reduce potential interference from the camera module.

The two WiFi antennas are separated to improve isolation and spacial diversity. Positioning the WiFi antennas on either end of the LTE-Aux antenna ensures at least 60 mm of separation between the WiFi feed points, as well as significant separation from the other transmitting antennas such as the LTE-Main antenna 200 and the WiGig RFEM 208. The separation between the WiFi antennas and the other transmitting antennas increases the opportunity for excluding the Simultaneous Transmission SAR test and reduces the regulatory SAR testing complexity and duration.

The diagram of FIG. 2 is not intended to indicate that the top bezel 114 of the display housing 104 is to include all of the components shown in FIG. 2. Depending on the details of a specific implementation, the top bezel 114 of the display housing 104 can include fewer or additional components and the components may have a different layout. Various additional component arrangements are described further in relation to FIGS. 10 to 13.

Figure 3:
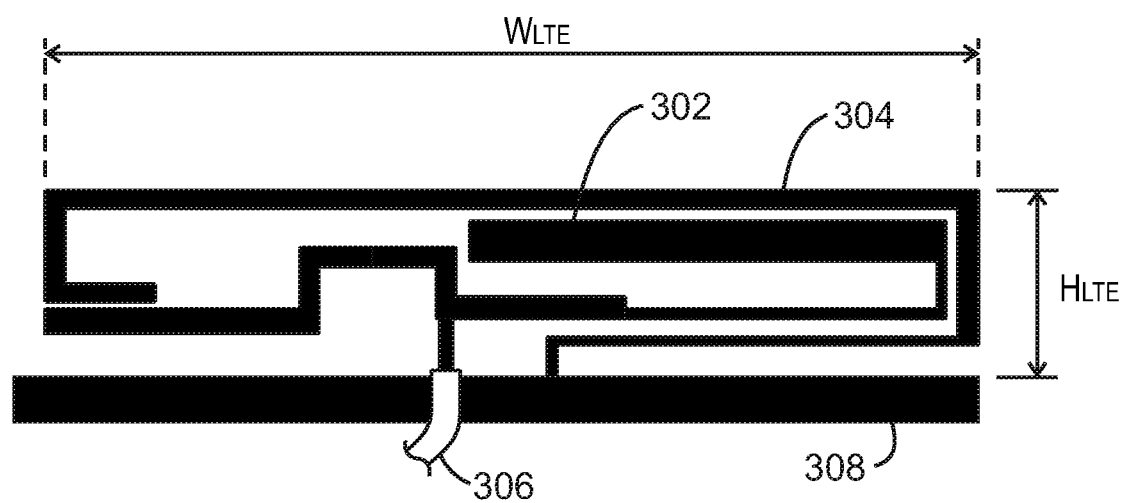
FIG. 3 is a diagram of an example LTE-Main antenna.

FIG. 3 is a diagram of an example LTE-Main antenna. The LTE-Main antenna 200 is a type of antenna known as a coupled monopole and includes a driven element 302 and a grounded element 304. The LTE-Main antenna 200 may be fabricated on one or more layers of a printed circuit board, including a surface layer. The driven element 302 is an electrically conductive radiating element that is coupled to a signal source through a feed 306, such as a coaxial feed. The grounded element 304 is an electrically conductive radiating element that is coupled to a ground plane 308. The driven element 302 and the grounded element 304 may be coplanar with each other and with the ground plane 308. For the sake of simplicity, only a portion of the ground plane is shown. The ground plane 308 runs parallel to the display screen 112 (FIG. 2) and may extend underneath a substantial portion of the display screen 112.

The shape and size of the driven element 302 and the grounded element 304 may be specified to exhibit resonant characteristics at a desired frequency or range of frequencies. In the example shown in FIG. 3, the overall width, $W_{LTE}$, of the LTE-Main antenna 200 may be approximately 50 mm, and the overall height, $H_{LTE}$, of the LTE-Main antenna 200 may be approximately 10 mm. It will be appreciated that the particular shape and size of the LTE-Main antenna 200 shown in FIG. 3 is only one example of a miniaturized LTE-Main antenna 200 that may be used in accordance with the techniques described herein.

Figure 4:
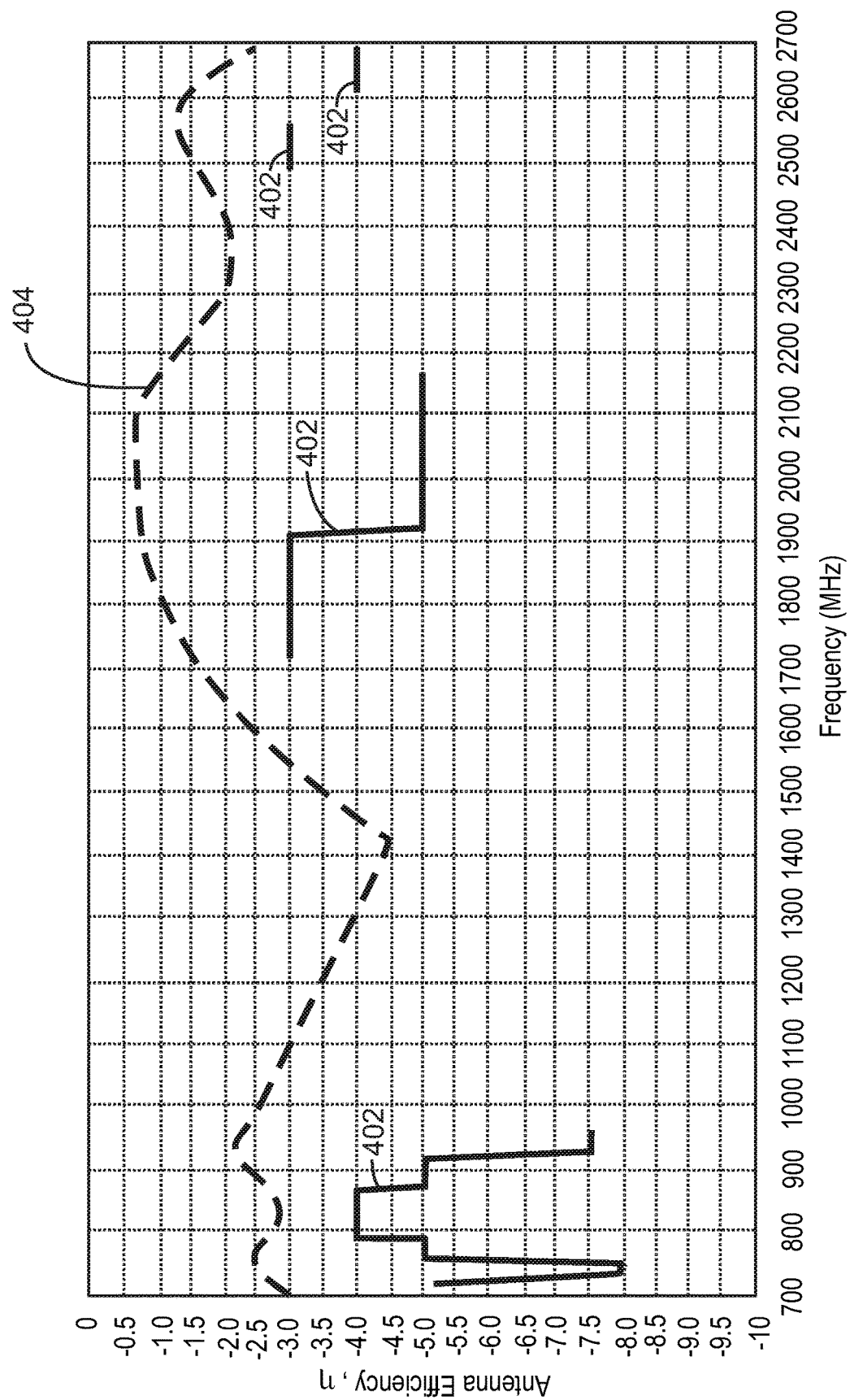
FIG. 4 is a graph showing example electrical characteristics of the LTE-Main antenna shown in FIG. 3.

FIG. 4 is a graph showing example electrical characteristics of the LTE-Main antenna 200 shown in FIG. 3. Specifically, FIG. 4 shows antenna efficiency of the LTE-Main antenna 200 across a range of frequencies. Antenna efficiency, η, is the ratio of the aperture effective area, Ae, to its actual physical area, A. LTE carrier specifications require certain minimum antenna efficiencies at specific frequency bands. The minimum antenna efficiencies are shown by the solid lines. The dashed line 404 represents the simulated antenna efficiency, η, computed for the LTE-Main antenna 200 shown in FIG. 3. The simulation results show that the LTE-Main antenna of FIG. 3 can be expected to meet or exceed the minimum antenna efficiency required for LTE carrier certification.

Figure 5:
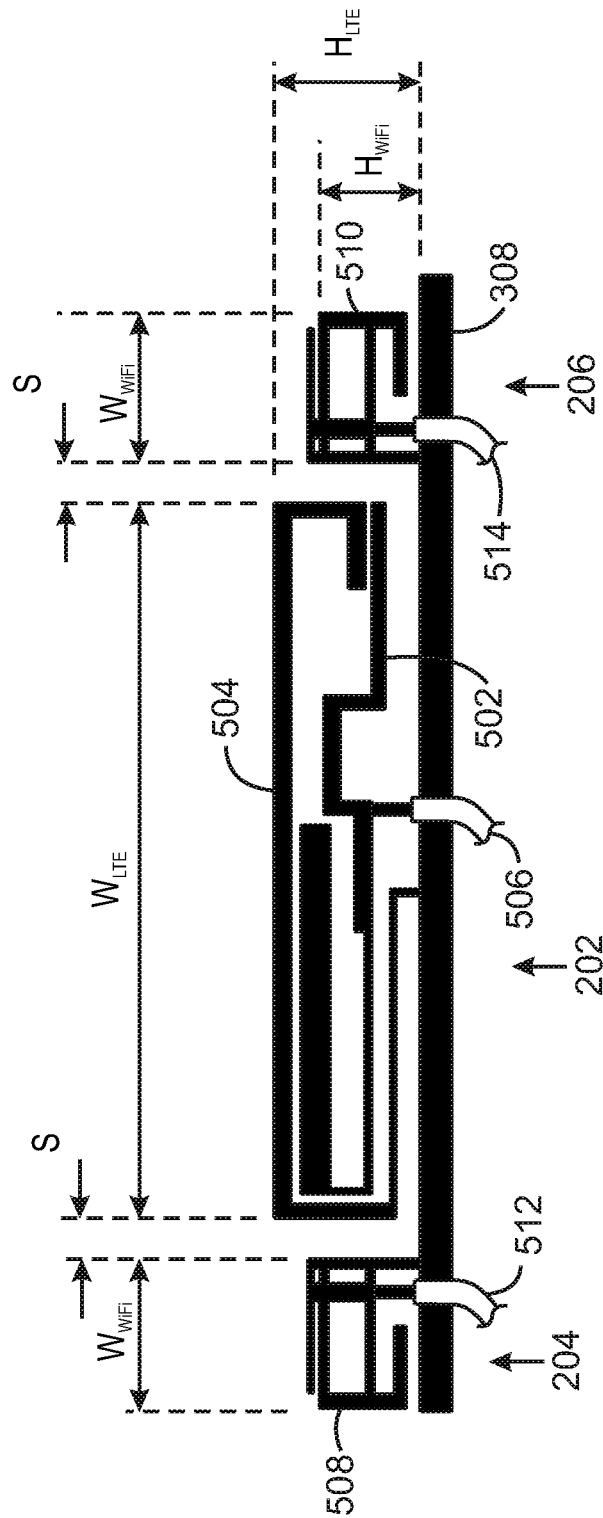
FIG. 5 is a diagram of an example LTE-Auxiliary antenna surrounded by two WiFi antennas.

FIG. 5 is a diagram of an example LTE-Auxiliary antenna surrounded by two WiFi antennas. The LTE-Auxiliary antenna 202 is a coupled monopole antenna and includes a driven element 502 and a grounded element 504. The LTE-Auxiliary antenna 202 may be fabricated on or more layers of a printed circuit board, including a surface layer. The driven element 502 is coupled to a signal source through a feed 506, such as a coaxial feed. The grounded element 304 is coupled to the same ground plane 308 as the LTE-Main antenna 200 (FIG. 3). Both the driven element 302 and the grounded element 304 are adjacent to the ground plane 308 and may be coplanar with each other and with the ground plane 308.

The shape and size of the driven element 302 and the grounded element 304 may be specified to exhibit resonant characteristics at a desired frequency or range of frequencies. In some embodiments, the LTE-Auxiliary antenna 202 is a mirror image of the LTE-Main antenna 200 and therefore exhibits similar electrical characteristics. The overall width, $W_{LTE}$, of the LTE-Auxiliary antenna 202 may be approximately 50 mm, and the overall height, $H_{LTE}$, of the LTE-Auxiliary antenna 202 may be approximately 10 mm. It will be appreciated that the particular shape and size of the LTE-Auxiliary antenna 202 shown in FIG. 3 is only one example of a miniaturized LTE-Auxiliary antenna 202 that may be used in accordance with the techniques described herein.

The WiFi antennas 202, 204 are both a type of monopole antenna referred to as an inverted-F antenna. Each WiFi antenna 202, 204 respectively includes a conductive radiating element 508, 510, which is coupled to ground at its base and coupled to a feed 512, 514 at an intermediate point along its length. WiFi antennas 202 and 204 may be fabricated on a layer of a printed circuit board, including a surface layer. Each WiFi antenna 202, 204 may be coplanar with the ground plane 308.

The shape and size of the radiating elements 508, 510 may be specified to exhibit resonant characteristics at a desired frequency or range of frequencies. Additionally, the radiating element 508 may be a mirror image of the radiating element 510. The overall width, $W_{WiFi}$, of each WiFi antenna 202, 204 may be approximately 10 mm, and the overall height, $H_{WiFi}$ of the of each WiFi antenna 202, 204 may be approximately 8 mm. It will be appreciated that the particular shape and size of the WiFi antennas 202, 204 shown in FIG. 5 is only one example of a miniaturized WiFi antenna that may be used in accordance with the techniques described herein. In the example shown in FIG. 5, the spacing, S, between the edges of the LTE-Auxiliary antenna 202 and the edges of the WiFi antennas 202, 204 is approximately 5 mm. However, other spacings may also be used. For examples, the spacing, S, may be approximately 3 mm to 7 mm.

Figure 6:
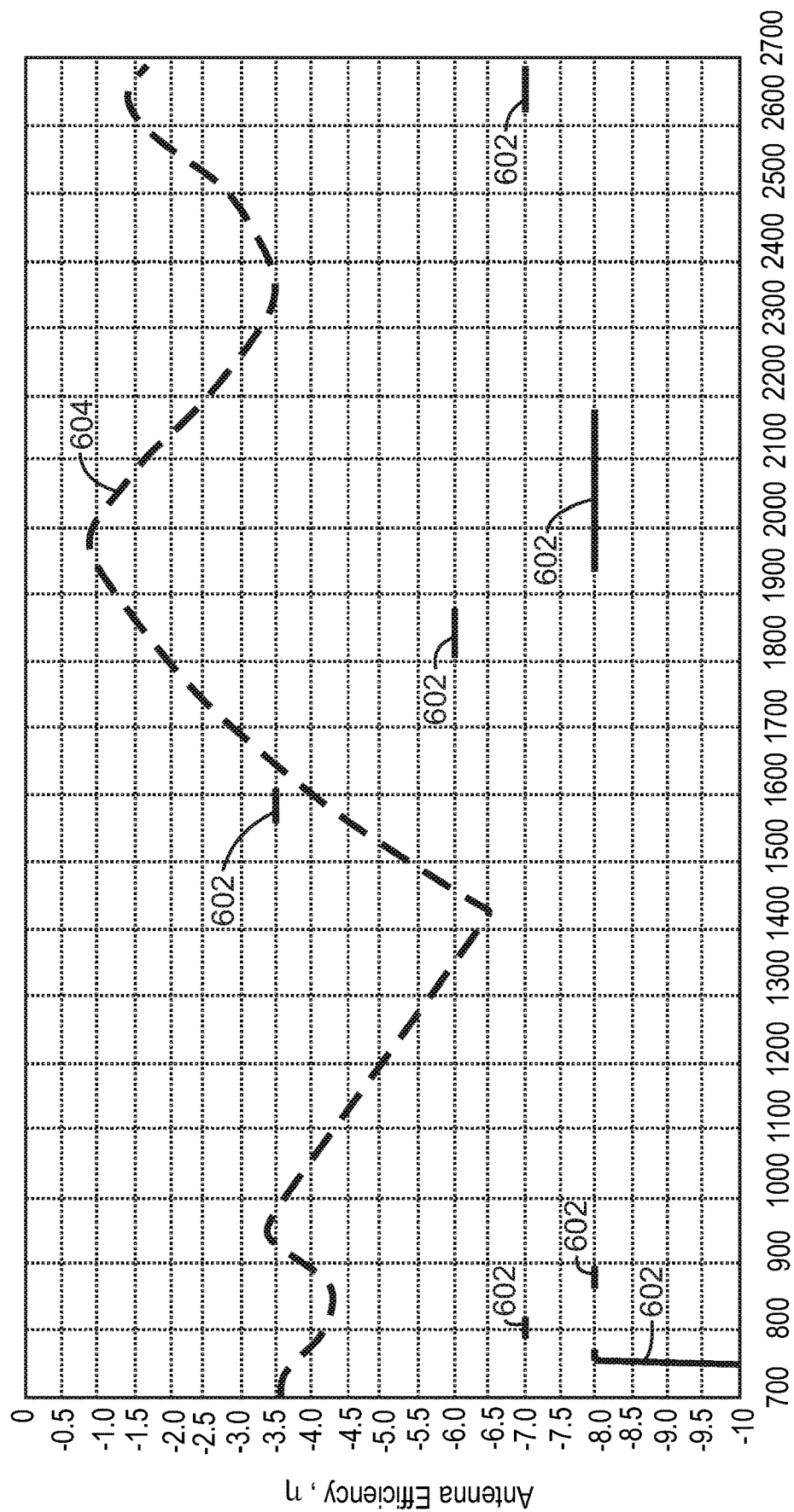
FIG. 6 is a graph showing example electrical characteristics of the LTE-Auxiliary antenna shown in FIG. 5.

FIG. 6 is a graph showing example electrical characteristics of the LTE-Auxiliary antenna 202 shown in FIG. 5. Specifically, FIG. 6 shows antenna efficiency of the LTE-Auxiliary antenna 202 across a range of frequencies. The minimum antenna efficiencies specified by the LTE carrier specifications are shown by the solid lines 602. The dashed line 604 represents the simulated antenna efficiency, η, computed for the LTE-Auxiliary antenna 202 shown in FIG. 5. The simulation results show that the LTE-Auxiliary antenna of FIG. 5 can be expected to meet or exceed the minimum antenna efficiency required for LTE carrier certification.

Figure 7:
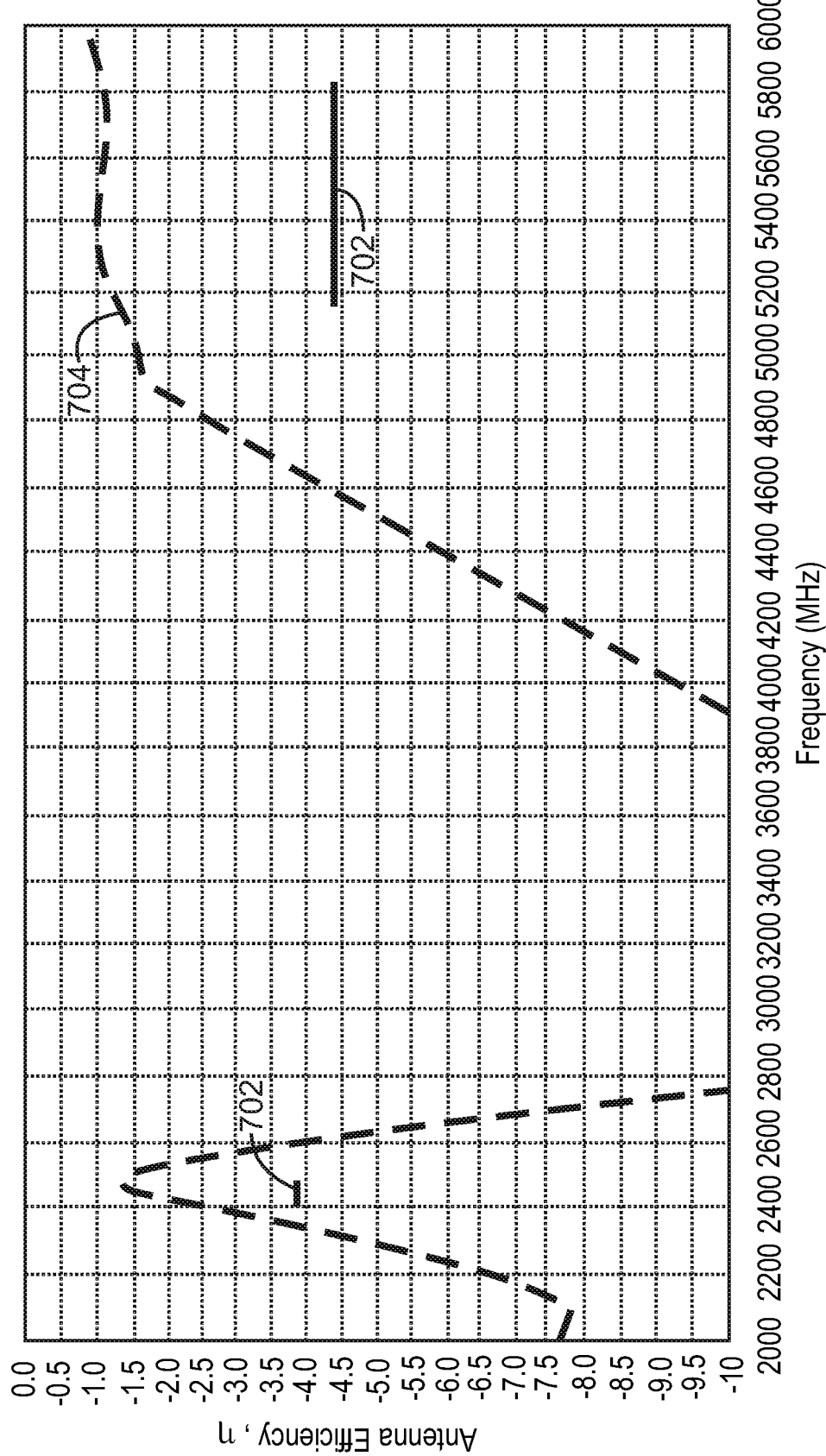
FIG. 7 is a graph showing example electrical characteristics of the left-side WiFi antenna shown in FIG. 5.

FIG. 7 is a graph showing example electrical characteristics of the left-side WiFi antenna 204 shown in FIG. 5. Specifically, FIG. 7 shows antenna efficiency of the left-side WiFi antenna 204 across a range of frequencies. The minimum antenna efficiencies specified by the WiFi specifications are shown by the solid lines 702. The dashed line 704 represents the simulated antenna efficiency, η, computed for the left-side WiFi antenna 204 shown in FIG. 5. The simulation results show the left-side WiFi antenna 204 of FIG. 5 can be expected to meet or exceed the minimum antenna efficiency required for WiFi certification.

Figure 8:
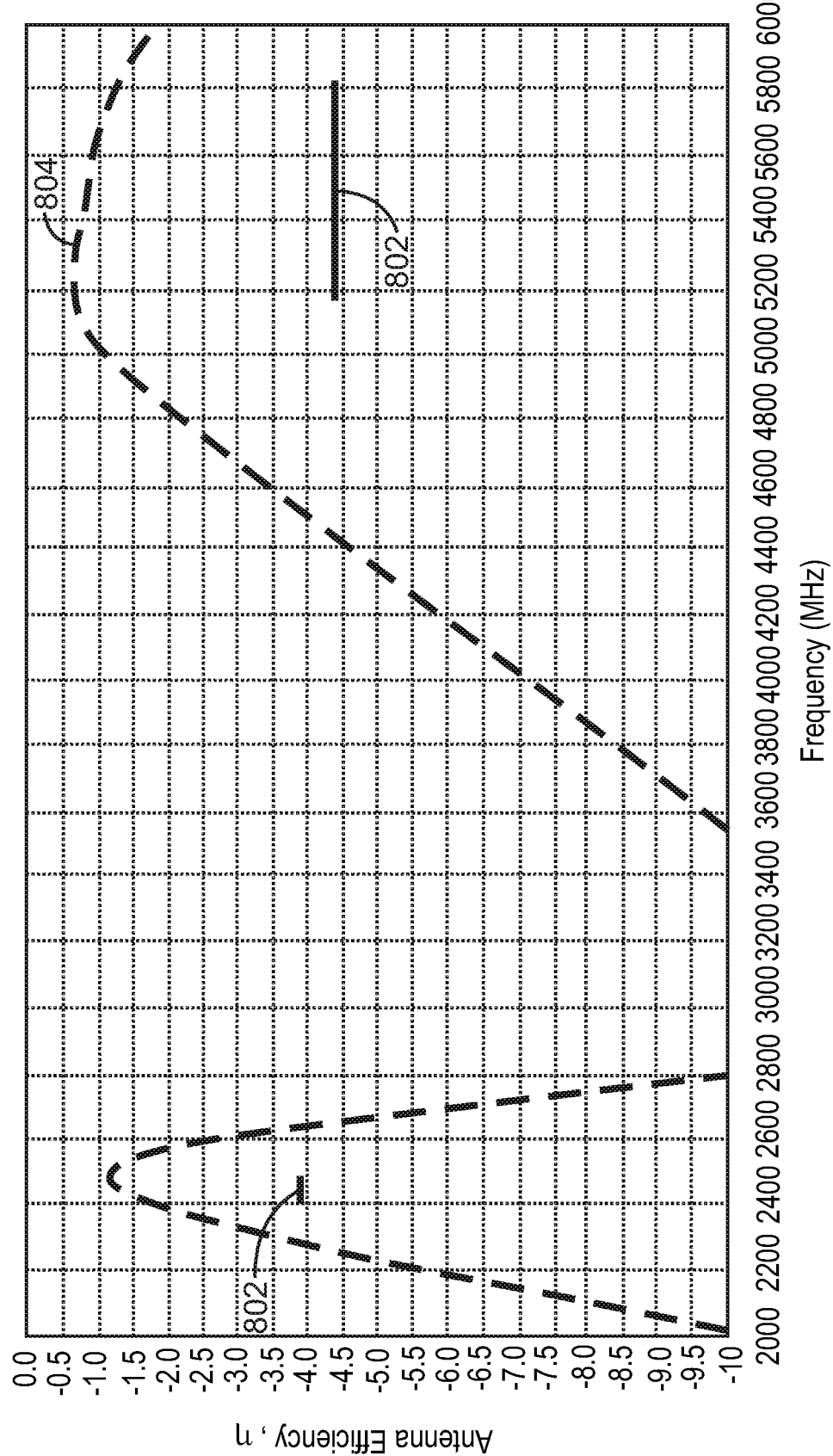
FIG. 8 is a graph showing example electrical characteristics of the right-side WiFi antenna 206 shown in FIG. 5.

FIG. 8 is a graph showing example electrical characteristics of the right-side WiFi antenna 206 shown in FIG. 5. Specifically, FIG. 8 shows antenna efficiency of the right-side WiFi antenna 206 across a range of frequencies. The minimum antenna efficiencies specified by the WiFi specifications are shown by the solid lines 802. The dashed line 804 represents the simulated antenna efficiency, η, computed for the right-side WiFi antenna 206 shown in FIG. 5. The simulation results show the right-side WiFi antenna 206 of FIG. 5 can be expected to meet or exceed the minimum antenna efficiency required for WiFi certification.

Figure 9:
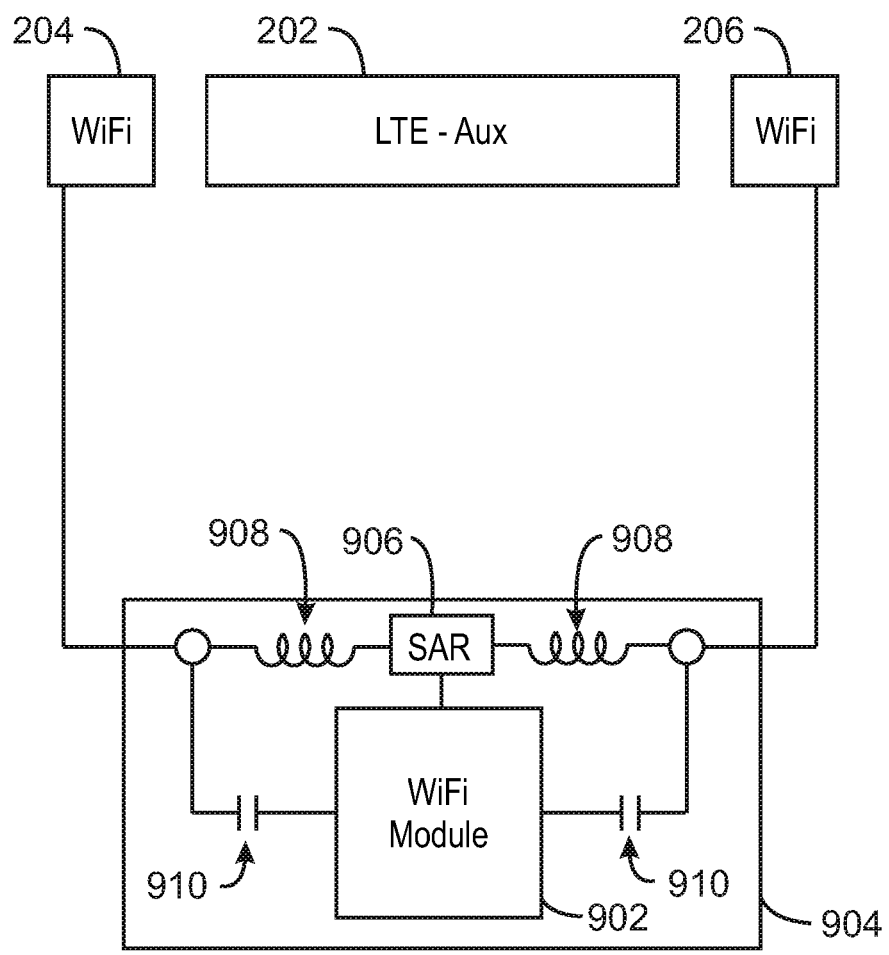
FIG. 9 is a block diagram of a system for enabling the WiFi antennas to serve as SAR proximity sensors.

FIG. 9 is a block diagram of a system for enabling the WiFi antennas to serve as SAR proximity sensors. The system includes a WiFi module 902. The WiFi module 902 may be implemented as one or more integrated circuit chips and can include any number of circuit components for transmitting and receiving WiFi signals through the WiFi antennas 204 and 206, including RF transmitters and receivers, baseband processor, filters, memory, and others. The WiFi module 902 also includes a bus interface (not shown) for communicating with a main processor of the computing device. The bus interface may use any suitable communication protocol, including Peripheral Component Interconnect Express (PCIe), Universal Serial Bus (USB), and others. The WiFi module may be disposed on a printed circuit board such as a plug-in card 904.

The plug-in card 904 also includes a SAR sensor 906 coupled to the WiFi antennas 204 and 206. The SAR sensor 906 processes signals received from the WiFi antennas 204 and 206 to determine whether there is an object, such as a person's hand, in close proximity to the WiFi antennas. The SAR sensor 906 is communicatively coupled to the WiFi module 902 to control power reduction of the WiFi module 902 in the event that the presence of human tissue is detected.

The WiFi antennas 204 and 206 may be coupled to the WiFi module 902 and SAR sensor 906 through any suitable filtering circuitry. The WiFi network operates at 2.4 GHz and 5 GHz band while the SAR sensor 906 operates at a few MHz or KHz. As shown in FIG. 9, the WiFi antennas 204 and 206 may be coupled to the SAR sensor 906 through an inductor that acts as a low pass filter, and the WiFi antennas 204 and 206 may be coupled to the WiFi module 902 through a capacitor that acts as high pass filter that passes the WLAN signal. Other arrangements for filtering the SAR signals and WLAN signals are also possible.

Figure 10:
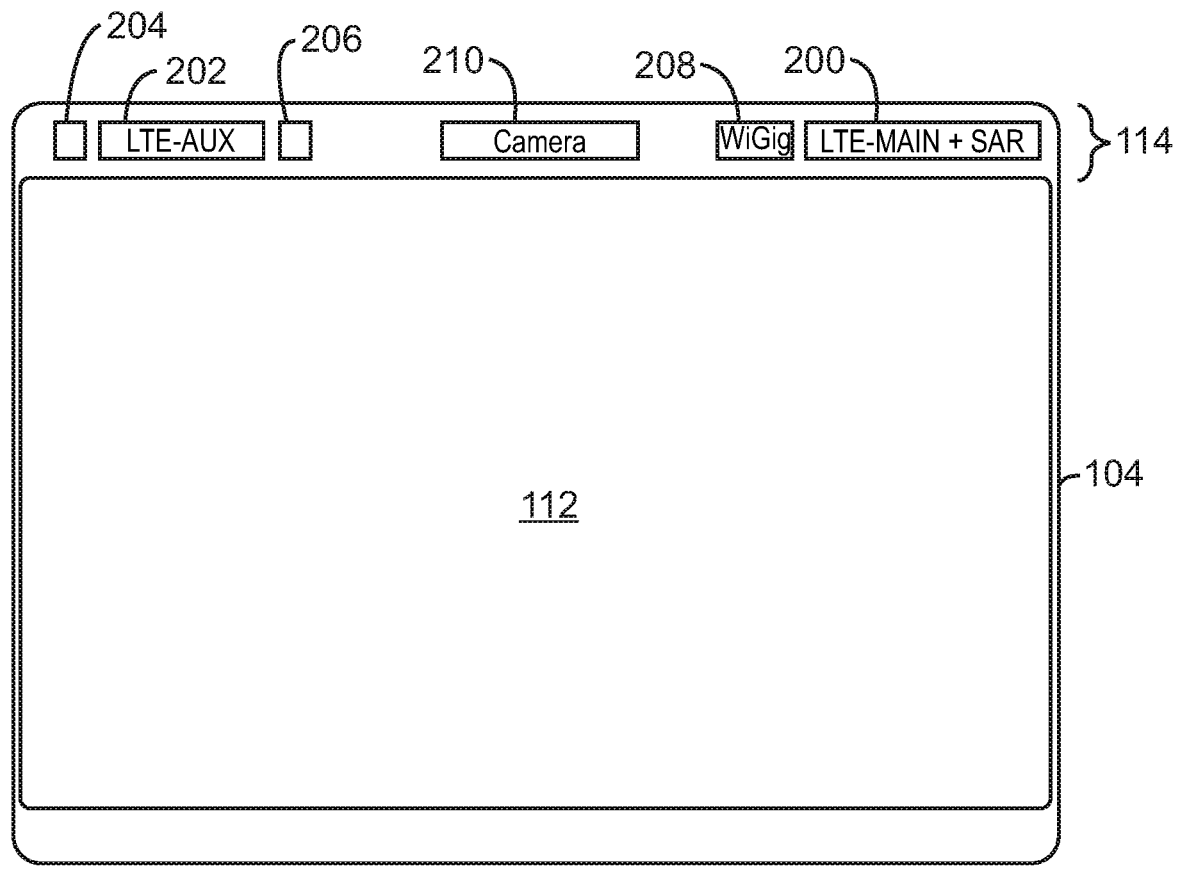
FIG. 10 is a diagram showing another example arrangement of antenna systems disposed within the top bezel of a computing device.

FIG. 10 is a diagram showing another example arrangement of antenna systems disposed within the top bezel of a computing device. The antenna arrangement shown in FIG. 10 is similar to the antenna arrangement shown in FIG. 2 with the exception that the positions of the LTE-Main antenna 200 and WiGig RFEM 208 are swapped. Swapping the positions of the LTE-Main antenna 200 and WiGig RFEM 208 increases the separation distance between the LTE-Main antenna 200 and the WiFi antennas 204, 206, which will improve the isolation between the LTE and WiFi antenna systems. In some embodiments, the WiGig antenna 208 can be eliminated.

Figure 11:
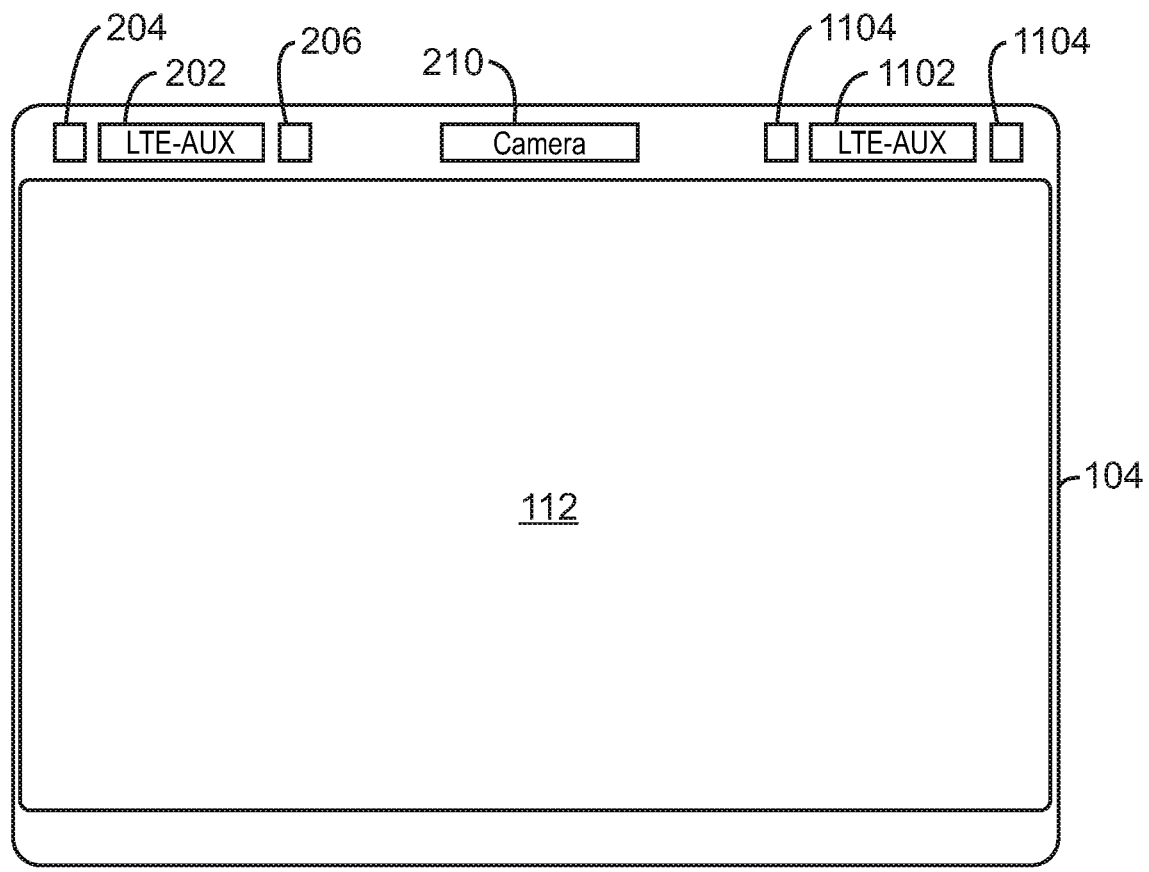
FIG. 11 is a diagram showing another example arrangement of antenna systems disposed within the top bezel of a computing device.

FIG. 11 is a diagram showing another example arrangement of antenna systems disposed within the top bezel of a computing device. The antenna arrangement shown in FIG. 11 is similar to the antenna arrangement shown in FIG. 2. However, in the embodiment of FIG. 11, the LTE-Main antenna 1102 is not used as a SAR proximity sensor. To meet regulatory SAR requirements, separate SAR proximity sensor pads 1104 are positioned adjacent to the LTE-Main antenna 1102.

Figure 12:
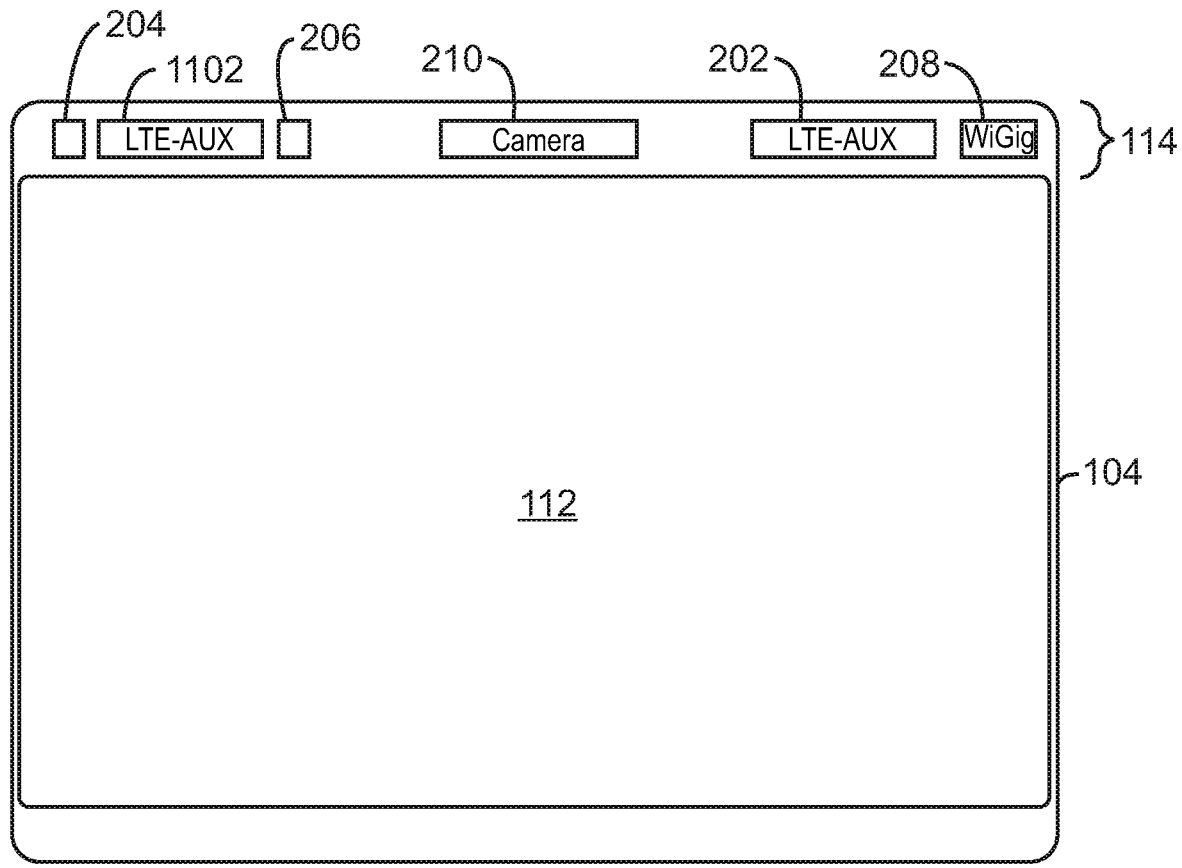
FIG. 12 is a diagram showing another example arrangement of antenna systems disposed within the top bezel of a computing device.

FIG. 12 is a diagram showing another example arrangement of antenna systems disposed within the top bezel of a computing device. The antenna arrangement shown in FIG. 12 is similar to the antenna arrangement shown in FIG. 11. However, in the arrangement shown in FIG. 12, the positions of the LTE-Main antenna 1102 and the LTE-Auxiliary antenna 202 are swapped. Additionally, the LTE-Main antenna 1102 is surrounded by the pair of WiFi antennas 204 and 206. Each WiFi antenna 204 and 206 serves as a SAR proximity sensor pad for both the WiFi system and the LTE-Main antenna 1102.

In the embodiment shown in FIG. 12, the top bezel 114 also includes the WiGig RFEM 208. In some embodiments, the WiGig RFEM 208 and the LTE-Auxiliary antenna can swap positions or the WiGig RFEM 208 could be eliminated.

Figure 13:
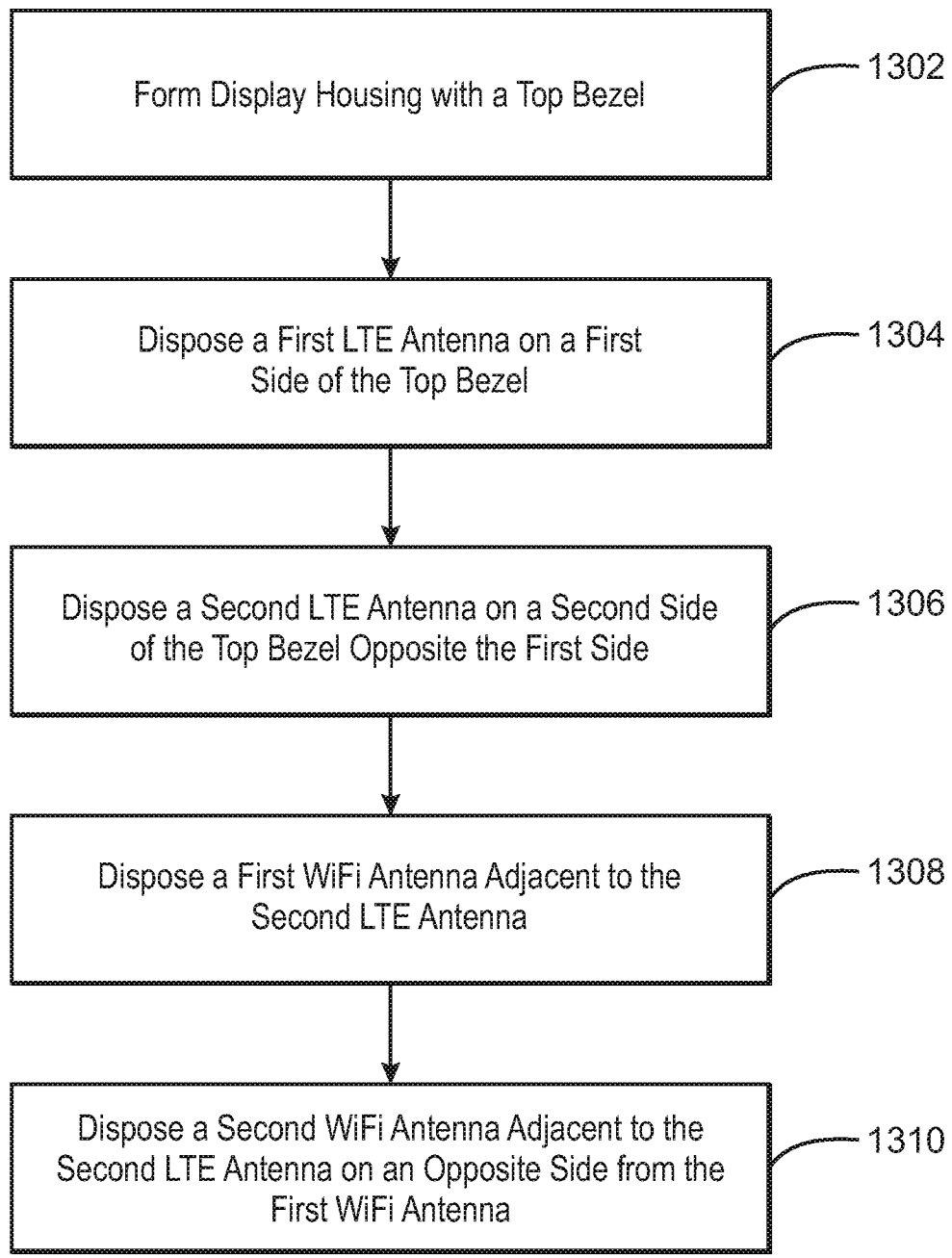
FIG. 13 is a process flow diagram of an example method of manufacturing an electronic device with a display.

FIG. 13 is a process flow diagram of an example method of manufacturing an electronic device with a display. The electronic device may be the electronic device shown in any of FIGS. 1, 2, and 10-12. The method 1300 may begin at block 1302.

At block 1302, a display housing is formed with a top bezel. The display housing may be configured to house an edge-to-edge display screen, which extends across a full width of the housing. In some examples, the display housing does not include side bezels. The width of the housing may be less than 300 millimeters.

At block 1304, a first LTE antenna is disposed in the top bezel on a first side of the top bezel (e.g., the left side or the right side). The first LTE antenna may be an LTE-Main antenna or an LTE auxiliary antenna that is configured only as receiver. Additionally, the first LTE antenna may configured to operate as a SAR proximity sensor pad.

At block 1304, a second LTE antenna is disposed on a second side of the top bezel opposite the first side. The second LTE antenna may be an LTE main antenna or an LTE auxiliary antenna that is configured only as receiver.

At block 1306, a first WiFi antenna is disposed adjacent to the second LTE antenna. At block 1308, a second WiFi antenna is disposed adjacent to the second LTE antenna on an opposite side from the first WiFi antenna. Both WiFi antennas may be configured to serve as SAR proximity sensor pads and may be coupled to a SAR proximity sensor through a low pass filter. If the second LTE antenna is an LTE main antenna, the WiFi antennas can also serve as SAR proximity sensor pads for the LTE system.

The method 1300 should not be interpreted as meaning that the blocks are necessarily performed in the order shown. Furthermore, fewer or greater actions can be included in the method 1300 depending on the design considerations of a particular implementation. For example, the method 1300 can also include disposing a stereoscopic camera module or a WiGig RFEM in the top bezel. The method 1300 can also include disposing the display screen and other related circuitry in the housing, and coupling the housing to a base of a laptop.

EXAMPLES

Example 1 is an electronic device with an integrated radio antenna complex. The electronic device includes a display housing with a display screen and top bezel disposed above the display screen. A plurality of components are disposed in the top bezel, including: a first cellular communication antenna disposed on a first side of the top bezel; a second cellular communication antenna disposed on a second side of the top bezel opposite the first side; a first WiFi antenna disposed adjacent to the second cellular communication antenna; and a second WiFi antenna disposed adjacent to the second cellular communication antenna on an opposite side from the first WiFi antenna.

Example 2 includes the electronic device of example 1, including or excluding optional features. In this example, the first cellular communication antenna comprises a Long Term Evolution (LTE)-Main antenna that also configured as a Specific Absorption Rate (SAR) proximity sensor pad, and the second cellular communication antenna comprises an LTE auxiliary antenna that is configured only as receiver.

Example 3 includes the electronic device of any one of examples 1 to 2, including or excluding optional features. In this example, the first WiFi antenna and the second WiFi antenna are configured as SAR proximity sensor pads.

Example 4 includes the electronic device of any one of examples 1 to 3, including or excluding optional features. In this example, first cellular communication antenna comprises an LTE auxiliary antenna that is configured only as receiver, the second cellular communication antenna comprises an LTE main antenna, and the first WiFi antenna and the second WiFi antenna are configured as SAR proximity sensor pads for the LTE main antenna.

Example 5 includes the electronic device of any one of examples 1 to 4, including or excluding optional features. In this example, the plurality of components disposed in the top bezel comprises a camera module. Optionally, the camera module comprises a stereoscopic camera module.

Example 6 includes the electronic device of any one of examples 1 to 5, including or excluding optional features. In this example, the plurality of components disposed in the top bezel comprises a WiGig Radio Front End Module (RFEM).

Example 7 includes the electronic device of any one of examples 1 to 6, including or excluding optional features. In this example, the plurality of components disposed in the top bezel comprises a stereoscopic camera module and a WiGig RFEM.

Example 8 includes the electronic device of any one of examples 1 to 7, including or excluding optional features. In this example, the display screen extends across a full width of the display housing.

Example 9 includes the electronic device of any one of examples 1 to 8, including or excluding optional features. In this example, a width of the display housing is less than 300 millimeters.

Example 10 is a method of manufacturing a computing device with an integrated radio antenna complex. The method includes forming a housing configured to contain a display screen, wherein the housing comprises a top bezel. The method also includes: disposing a first cellular communication antenna on a first side of the top bezel; disposing a second cellular communication antenna on a second side of the top bezel opposite the first side; disposing a first WiFi antenna adjacent to the second LTE antenna; and disposing a second WiFi antenna adjacent to the second LTE antenna on an opposite side from the first WiFi antenna.

Example 11 includes the method of example 10, including or excluding optional features. In this example, the first cellular communication antenna comprises an LTE-Main antenna that also configured as a SAR proximity sensor pad, and the second cellular communication antenna comprises an LTE auxiliary antenna that is configured only as receiver.

Example 12 includes the method of any one of examples 10 to 11, including or excluding optional features. In this example, the method includes communicatively coupling the first WiFi antenna and the second WiFi antenna to a SAR proximity sensor through a low pass filter.

Example 13 includes the method of any one of examples 10 to 12, including or excluding optional features. In this example, first cellular communication antenna comprises an LTE auxiliary antenna that is configured only as receiver, the second cellular communication antenna comprises an LTE main antenna, and wherein the method comprises communicatively coupling the first WiFi antenna and the second WiFi antenna to a SAR proximity sensor associated with the LTE main antenna.

Example 14 includes the method of any one of examples 10 to 13, including or excluding optional features. In this example, the method includes disposing a camera module in the top bezel between the first LTE antenna and the second WiFi antenna. Optionally, the camera module comprises a stereoscopic camera module.

Example 15 includes the method of any one of examples 10 to 14, including or excluding optional features. In this example, the method includes disposing a WiGig RFEM in the top bezel adjacent to the first cellular communication antenna.

Example 16 includes the method of any one of examples 10 to 15, including or excluding optional features. In this example, the method includes disposing a stereoscopic camera module and a WiGig RFEM in the top bezel.

Example 17 includes the method of any one of examples 10 to 16, including or excluding optional features. In this example, the method includes disposing the display screen in the display housing, wherein the display screen extends across a full width of the housing.

Example 18 includes the method of any one of examples 10 to 17, including or excluding optional features. In this example, a width of the housing is less than 300 millimeters.

Example 19 is a laptop computer with an integrated radio antenna complex. The laptop computer includes a base and a display housing attached to the base. The display housing includes a display screen and top bezel disposed above the display screen. The display housing also includes: a first cellular communication antenna disposed on a first side of the top bezel; a second cellular communication antenna disposed on a second side of the top bezel opposite the first side; a first WiFi antenna disposed adjacent to the second cellular communication antenna; and a second WiFi antenna disposed adjacent to the second cellular communication antenna on an opposite side from the first WiFi antenna.

Example 20 includes the laptop computer with an integrated radio antenna complex of example 19, including or excluding optional features. In this example, the first cellular communication antenna comprises an LTE-Main antenna that is also configured as a SAR proximity sensor pad, and the second cellular communication antenna comprises an LTE auxiliary antenna that is configured only as receiver.

Example 21 includes the laptop computer with an integrated radio antenna complex of any one of examples 19 to 20, including or excluding optional features. In this example, the first WiFi antenna and the second WiFi antenna are configured as SAR proximity sensor pads.

Example 22 includes the laptop computer with an integrated radio antenna complex of any one of examples 19 to 21, including or excluding optional features. In this example, first cellular communication antenna comprises an LTE auxiliary antenna that is configured only as receiver, the second cellular communication antenna comprises an LTE main antenna, and the first WiFi antenna and the second WiFi antenna are configured as SAR proximity sensor pads for the LTE main antenna.

Example 23 includes the laptop computer with an integrated radio antenna complex of any one of examples 19 to 22, including or excluding optional features. In this example, the laptop computer with an integrated radio antenna complex includes a camera module disposed in the top bezel. Optionally, the camera module comprises a stereoscopic camera module.

Example 24 includes the laptop computer with an integrated radio antenna complex of any one of examples 19 to 23, including or excluding optional features. In this example, the laptop computer with an integrated radio antenna complex includes a WiGig RFEM disposed in the top bezel.

Example 25 includes the laptop computer with an integrated radio antenna complex of any one of examples 19 to 24, including or excluding optional features. In this example, the laptop computer with an integrated radio antenna complex includes a stereoscopic camera module and a WiGig RFEM disposed in the top bezel.

Example 26 includes the laptop computer with an integrated radio antenna complex of any one of examples 19 to 25, including or excluding optional features. In this example, the display screen extends across a full width of the display housing.

Example 27 includes the laptop computer with an integrated radio antenna complex of any one of examples 19 to 26, including or excluding optional features. In this example, a width of the display housing is less than 300 millimeters.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device with an integrated radio antenna complex, comprising:
   a display housing comprising a display screen and top bezel disposed above the display screen on an opposite side of the display screen from a keyboard attachment, wherein the top bezel does not extend along sides of the display screen perpendicular to the top bezel; and
   a plurality of components disposed in the top bezel, wherein the plurality of components comprises:
   a first cellular communication antenna disposed on a first side of the top bezel;
   a second cellular communication antenna disposed on a second side of the top bezel opposite the first side;
   a first WiFi antenna disposed adjacent to the second cellular communication antenna; and
   a second WiFi antenna disposed adjacent to the second cellular communication antenna on an opposite side of the second cellular communication antenna from the first WiFi antenna.

2. The electronic device of claim 1, wherein the first cellular communication antenna comprises a Long Term Evolution (LTE)-Main antenna that also configured as a Specific Absorption Rate (SAR) proximity sensor pad, and the second cellular communication antenna comprises an LTE auxiliary antenna that is configured only as receiver.

3. The electronic device of claim 1, wherein the first WiFi antenna and the second WiFi antenna are configured as SAR proximity sensor pads.

4. The electronic device of claim 1, wherein first cellular communication antenna comprises an LTE auxiliary antenna that is configured only as receiver, the second cellular communication antenna comprises an LTE main antenna, and the first WiFi antenna and the second WiFi antenna are configured as SAR proximity sensor pads for the LTE main antenna.

5. The electronic device of claim 1, wherein the plurality of components disposed in the top bezel comprises a camera module.

6. The electronic device of claim 5, wherein the camera module comprises a stereoscopic camera module.

7. The electronic device of claim 1, wherein the plurality of components disposed in the top bezel comprises a WiGig Radio Front End Module (RFEM).

8. The electronic device of claim 1, wherein the plurality of components disposed in the top bezel comprises a stereoscopic camera module and a WiGig RFEM.

9. The electronic device of claim 1, wherein the display screen extends across a full width of the display housing.

10. The electronic device of claim 1, wherein a width of the display housing is less than 300 millimeters.

11. A method of manufacturing a computing device with an integrated radio antenna complex, comprising:
forming a housing configured to contain a display screen, wherein the housing comprises a top bezel on an opposite side of the display screen from a keyboard attachment, wherein the top bezel does not extend along sides of the display screen perpendicular to the top bezel;
disposing a first cellular communication antenna on a first side of the top bezel;
disposing a second cellular communication antenna on a second side of the top bezel opposite the first side;
disposing a first WiFi antenna adjacent to the second LTE antenna; and
disposing a second WiFi antenna adjacent to the second LTE antenna on an opposite side of the second cellular communication antenna from the first WiFi antenna.

12. The method of claim 11, wherein the first cellular communication antenna comprises an LTE-Main antenna that also configured as a SAR proximity sensor pad, and the second cellular communication antenna comprises an LTE auxiliary antenna that is configured only as receiver.

13. The method of claim 11, comprising communicatively coupling the first WiFi antenna and the second WiFi antenna to a SAR proximity sensor through a low pass filter.

14. The method of claim 11, wherein first cellular communication antenna comprises an LTE auxiliary antenna that is configured only as receiver, the second cellular communication antenna comprises an LTE main antenna, and wherein the method comprises communicatively coupling the first WiFi antenna and the second WiFi antenna to a SAR proximity sensor associated with the LTE main antenna.

15. The method of claim 11, comprising disposing a camera module in the top bezel between the first LTE antenna and the second WiFi antenna.

16. The method of claim 15, wherein the camera module comprises a stereoscopic camera module.

17. The method of claim 11, comprising disposing a WiGig RFEM in the top bezel adjacent to the first cellular communication antenna.

18. The method of claim 11 comprising disposing a stereoscopic camera module and a WiGig RFEM in the top bezel.

19. The method of claim 11, comprising disposing the display screen in the display housing, wherein the display screen extends across a full width of the housing.

20. The method of claim 11, wherein a width of the housing is less than 300 millimeters.

21. A laptop computer with an integrated radio antenna complex, comprising:
a base;
a display housing attached to the base, the display housing comprising a display screen and top bezel disposed above the display screen on an opposite side of the display screen from a keyboard attachment, wherein the top bezel does not extend along sides of the display screen perpendicular to the top bezel;
a first cellular communication antenna disposed on a first side of the top bezel;
a second cellular communication antenna disposed on a second side of the top bezel opposite the first side;
a first WiFi antenna disposed adjacent to the second cellular communication antenna; and
a second WiFi antenna disposed adjacent to the second cellular communication antenna on an opposite side of the second cellular communication antenna from the first WiFi antenna.

22. The laptop computer of claim 21, wherein the first cellular communication antenna comprises an LTE-Main antenna that is also configured as a SAR proximity sensor pad, and the second cellular communication antenna comprises an LTE auxiliary antenna that is configured only as receiver.

23. The laptop computer of claim 21, wherein the first WiFi antenna and the second WiFi antenna are configured as SAR proximity sensor pads.

24. The laptop computer of claim 21, wherein first cellular communication antenna comprises an LTE auxiliary antenna that is configured only as receiver, the second cellular communication antenna comprises an LTE main antenna, and the first WiFi antenna and the second WiFi antenna are configured as SAR proximity sensor pads for the LTE main antenna.

25. The laptop computer of claim 21, comprising a camera module disposed in the top bezel.

* * * * *